(12) United States Patent
Madonna et al.

(10) Patent No.: US 11,941,228 B2
(45) Date of Patent: Mar. 26, 2024

(54) GUIDANCE SET-UP FOR COMPANION MODULE GRAPHICAL DISPLAY

(71) Applicant: Savant Systems, Inc., Hyannis, MA (US)

(72) Inventors: Robert P. Madonna, Osterville, MA (US); Wilson D. Callan, Swansea, MA (US); Christopher Lawrence, Hamden, CT (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

(21) Appl. No.: 17/462,992

(22) Filed: Aug. 31, 2021

(65) Prior Publication Data

US 2023/0069678 A1  Mar. 2, 2023

(51) Int. Cl.
*G06F 3/14* (2006.01)
*G06F 3/0482* (2013.01)
(Continued)

(52) U.S. Cl.
CPC .......... *G06F 3/0482* (2013.01); *G06F 3/0484* (2013.01); *G06F 3/04886* (2013.01);
(Continued)

(58) Field of Classification Search
CPC ......... H01H 13/14; G06F 3/0482; G06F 3/14; G06F 3/04886; H04W 4/80
See application file for complete search history.

(56) References Cited

U.S. PATENT DOCUMENTS

| 4,001,646 A | 1/1977 | Howell |
| 5,185,705 A | 2/1993 | Farrington |

(Continued)

FOREIGN PATENT DOCUMENTS

| CN | 204230176 U | 3/2015 |
| JP | 2005110218 A | 4/2005 |

(Continued)

OTHER PUBLICATIONS

Demeo, Anna, et al. "Community smart grid utilizing dynamic demand response and tidal power for grid stabilization." *Smart Grid and Renewable Energy* 4.07 (2013): 465-472.

(Continued)

*Primary Examiner* — Andrea C Leggett
(74) *Attorney, Agent, or Firm* — Cesari and McKenna, LLP

(57) ABSTRACT

A menu selection technique is based on orientation of a companion module used in a flexible load management (FLM) system. The FLM system includes a load center that utilizes circuit breakers in combination with companion modules (i.e., intelligent controllers). Each companion module has a graphical display as well as a push button included on a face of the module as an input device used to display and input information including icons, buttons, controls, messages, status, menus or other desired text on a user interface (UI) to enable a user to configure and operate the companion module. The companion module also includes an accelerometer configured to detect a gravitational orientation (i.e., a first orientation and an opposite or upside-down orientation) and movement of the module and, in response, generate a signal that is translated to a corresponding change in orientation of the information displayed on the UI, particularly when the companion module inserted into the load center.

18 Claims, 4 Drawing Sheets

(51) Int. Cl.
*G06F 3/0484* (2022.01)
*G06F 3/04886* (2022.01)
*H01H 13/14* (2006.01)
*H04W 4/80* (2018.01)

(52) U.S. Cl.
CPC .............. *G06F 3/14* (2013.01); *H01H 13/14* (2013.01); *H04W 4/80* (2018.02)

(56) References Cited

U.S. PATENT DOCUMENTS

| | | | |
|---|---|---|---|
| 5,909,180 A * | 6/1999 | Bailey | H02J 13/00001 340/638 |
| 6,289,267 B1 * | 9/2001 | Alexander | H02H 3/00 700/286 |
| 7,043,380 B2 | 5/2006 | Rodenberg, III | |
| 9,105,180 B2 | 8/2015 | McKinley et al. | |
| 2002/0010518 A1 * | 1/2002 | Reid | H05B 47/175 705/28 |
| 2006/0129281 A1 | 6/2006 | Cargnelli et al. | |
| 2007/0222295 A1 | 9/2007 | Wareham et al. | |
| 2009/0079732 A1 * | 3/2009 | Fitzmaurice | G06F 3/04815 345/520 |
| 2010/0161146 A1 | 6/2010 | Boss et al. | |
| 2010/0169030 A1 * | 7/2010 | Parlos | G01R 31/343 702/58 |
| 2010/0194682 A1 | 8/2010 | Orr | |
| 2010/0216515 A1 | 8/2010 | White et al. | |
| 2011/0210712 A1 | 9/2011 | Tagare | |
| 2012/0236442 A1 * | 9/2012 | Satyanarayana | G05F 1/70 361/35 |
| 2012/0239218 A1 | 9/2012 | Forbes, Jr. | |
| 2014/0067144 A1 | 3/2014 | Chen et al. | |
| 2014/0277800 A1 | 9/2014 | Hughes | |
| 2014/0379161 A1 | 12/2014 | Busser | |
| 2015/0012145 A1 | 1/2015 | Kiko | |
| 2015/0042286 A1 | 2/2015 | Lu et al. | |
| 2015/0214768 A1 | 7/2015 | Matsuyama et al. | |
| 2015/0276253 A1 | 10/2015 | Montalvo | |
| 2015/0280436 A1 | 10/2015 | Weckx et al. | |
| 2016/0350778 A1 | 12/2016 | Levine et al. | |
| 2016/0358722 A1 | 12/2016 | Lakshmanan et al. | |
| 2017/0236676 A1 | 8/2017 | Bartonek | |
| 2018/0082816 A1 | 3/2018 | Herrmann | |
| 2018/0229988 A1 * | 8/2018 | Gault | B66F 9/24 |
| 2018/0299160 A1 | 10/2018 | Inuga et al. | |
| 2018/0342870 A1 | 11/2018 | Zeng et al. | |
| 2021/0173364 A1 | 6/2021 | Telefus et al. | |

FOREIGN PATENT DOCUMENTS

| | | |
|---|---|---|
| JP | 201222706 A | 2/2012 |
| WO | WO-2004023624 A1 | 3/2004 |
| WO | WO-2005065148 A2 | 7/2005 |
| WO | WO-2007027063 A1 | 3/2007 |
| WO | WO-2010065197 A2 | 6/2010 |
| WO | WO-2011073020 A2 | 6/2011 |
| WO | WO-2015134987 A1 | 9/2015 |

OTHER PUBLICATIONS

EP Office Action dated Jun. 7, 2021, EP Application No. 17 777 715.8-1202, 4 pages.

Husen et al. "Lighting Systems Control for Demand Response," IEEE 2011, 6 pages.

Kempton, Willett et al. "Vehicle-to-grid power implementation: From stabilizing the grid to supporting large-scale renewable energy." *Journal of power sources* 144.1 (2005): 280-294.

Park, Sung Min. "Control and Integration Strategies for Bidirectional and Unidirectional Converters in Residential Distributed Power Systems." (2015).

PCT Notification of Transmittal of the International Search Report and the Written Opinion of the International Searching Authority, or the Declaration, International Searching Authority, International Application No. PCT/US2017/051808, dated May 14, 2018, 24 pages.

PCT Invitation to Pay Additional Fees and, Where Applicable, Protest Fee, International Application No. PCT/US2017/051808, dated Dec. 1, 2017, 14 pages.

PCT Notification of Transmittal of the International Search Report and the Written Opinion of the International Searching Authority, or the Declaration, International Searching Authority, International Application No. PCT/US2022/042148, dated Dec. 16, 2022, 16 pages.

* cited by examiner

GUIDANCE SET-UP FOR COMPANION MODULE GRAPHICAL DISPLAY

BACKGROUND

Technical Field

The present disclosure relates generally to graphical displays and, more specifically, to a graphical display of an intelligent controller used to display information used to configure and operate the controller.

Background Information

Circuit breakers may be arranged in numerous slots of a load center and typically have different orientations on a left or right side of the load center, i.e., the breaker may be inverted ("upside-down") from one side to the other. As such, intelligent breakers that include a display screen require a means for correct screen image orientation and slot identification when placed in the load center.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a menu selection technique based on orientation of a companion module used in a flexible load management (FLM) system. The FLM system includes a load center embodying a virtual critical load panel (vCLP) that utilizes circuit breakers in combination with companion modules (i.e., intelligent controllers). Each companion module has a graphical display as well as a push button included on a face of the module as an input device used to display and input information including icons, buttons, controls, messages, status, menus or other desired text on a user interface (UI) to enable a user to configure and operate the companion module. The companion module also includes an accelerometer configured to detect a gravitational orientation (i.e., a first orientation and an opposite or upside-down orientation) and movement of the module and, in response, generate a signal that is translated to a corresponding change in orientation of the information displayed on the UI, particularly when the companion module inserted into the load center.

In an embodiment, a menu of the UI displays a list of enumerated "slot numbers," where the slot number identifies a physical location at which the companion module is inserted (mounted) in the load center. To limit the information presented on the UI, e.g., per convention and/or regulation in a jurisdiction where the load center is installed, the technique employs different menu displays depending on the detected orientation. For example, the different menu displays may include ODD numbers for slots on the LEFT side (i.e., companion module in a first orientation) of the load center and EVEN numbers for slots on the RIGHT side (i.e., companion module in a second orientation opposite or upside-down relative to the first orientation) of the load center. Note that the slot numbering convention may be altered depending on the slot position.

DESCRIPTION

Figure 1:
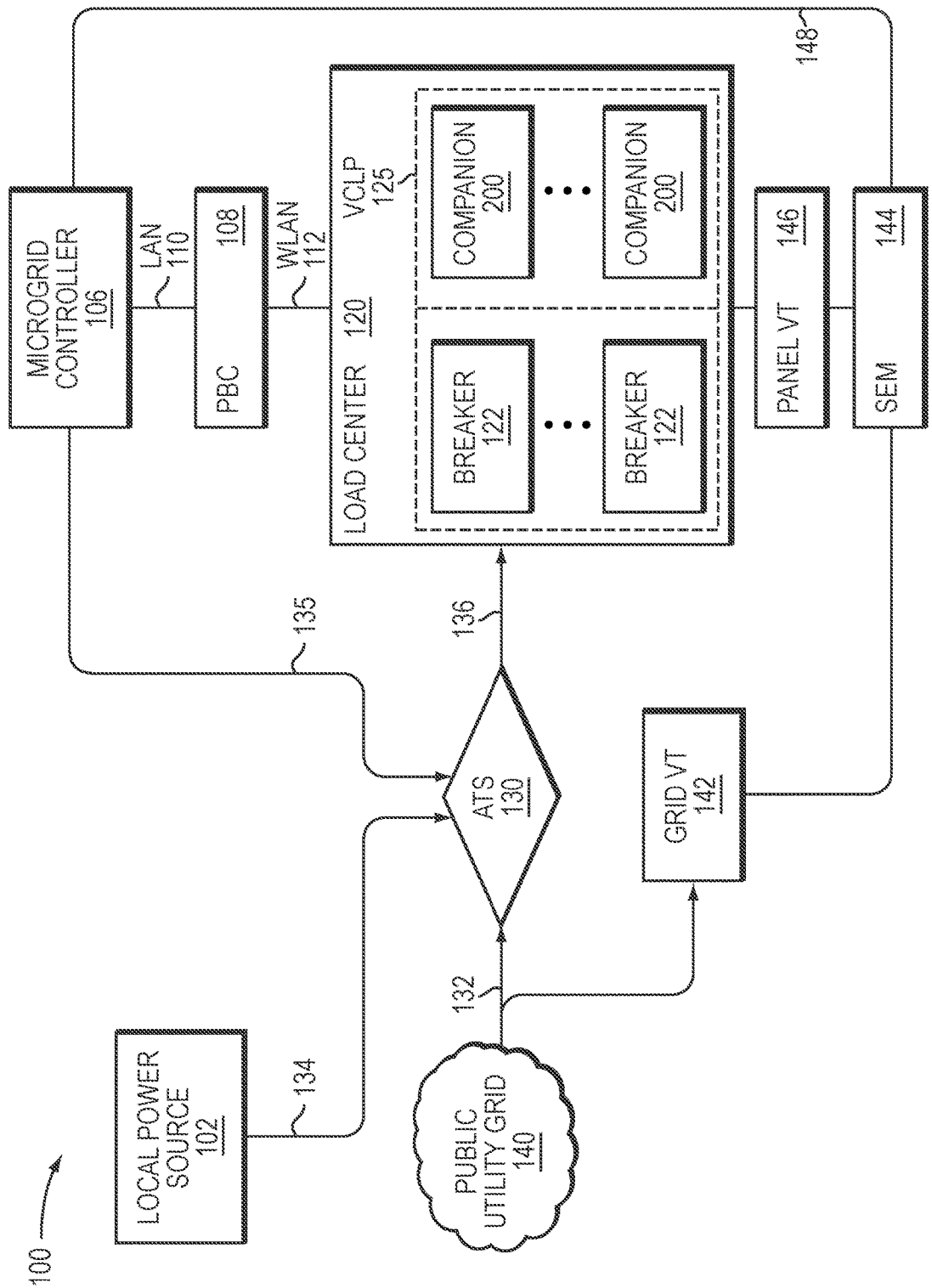
FIG. 1 illustrates an exemplary deployment of a flexible load management (FLM) system within a premises.

FIG. 1 illustrates an exemplary deployment of a flexible load management (FLM) system 100 within a premises, such as a place of business or home. The FLM system 100 employs one or more virtual critical load panels (vCLPs) in a load center 120, wherein each vCLP provides a prioritization of the loads that are considered sufficiently important to warrant protection by a local power source 102 of the premises as a failover and/or to supplement power availability. As described herein, the FLM system 100 utilizes circuit interrupts or breakers 122 in combination with companion modules 200 (i.e., intelligent controllers) to vary the prioritization of loads within the premises by time of day, season or even dynamically.

In one or more embodiments, the local power source 102 for the premises may be a generator or battery inverter, the latter of which converts direct current (DC) from a battery to alternating current (AC) of high voltage. However, in an illustrative embodiment, the local power source 102 may be a microgrid configured to generate is substantial power, e.g., in a range of 5 kilowatts (kW) to 30 kW, that is sufficient to power numerous and different types of loads.

A microgrid 106 is configured to manage power consumption and/or other high-level control functions in the FLM 100, e.g., determining which loads shall be activated (powered). To that end, the microgrid controller 106 may include a processor configured to execute software and manipulate data structures maintained in a memory (e.g., a persistent or volatile memory) having locations for storing the software and the data structures. The data structures may include a state center, which may utilize states of components/devices in the FLM system 100 to describe the configuration of the components/devices, as well as to maintain other types of information. The microgrid controller 106 may also include interfaces containing mechanical, electrical and signaling circuitry needed to connect and communicate with those components/devices. In an embodiment, the microgrid controller 106 may be implemented based on a host commercially available from Savant Systems, LLC.

A panel bridge controller (PBC) 108 connects to the microgrid controller 106 via a local area network (LAN) 110, such as Ethernet. The PBC 108 is configured to convert commands received over the LAN 110 from the microgrid controller 106 to messages provided to the load center 120 over a wireless LAN (WLAN) 112 in accordance with a wireless messaging protocol, such as Bluetooth. The commands received over the LAN 110 and WLAN 112 from the microgrid controller 106 are configured to control the companion modules 200 of the load center 120. As described further herein, a companion module 200 monitors (senses) voltage and current (power) of a load and wirelessly communicates (via Bluetooth) to a PBC 108 to enable remote control of the companion module from a mobile application (e.g., executing on a mobile device of a user). Notably, normally-open (NO) relays in each companion module function as an inhibitor to prevent the local power source 102 from turning-on unless and until the FLM system 100 is in a safe state, i.e., the number of connected companion modules is few enough to ensure that the power source will not overload when started.

The load center 120 may include one or more electrical panels that, during normal operation, is provided with, e.g., 200 ampere (amp) service from a public utility grid 140. In an embodiment, the load center 120 is configured to receive power over power feed 136 from the grid 140 via a main power feed 132 and an automatic transfer switch (ATS) 130 (having a transfer time to switch power to the local power source), and distribute the power (i.e., current) to branch circuits of the premises via the circuit breaker 122 enclosed in the electrical panel. Illustratively, the electrical panel is embodied as a vCLP 125 by the inclusion of companion modules 200 hardwired (e.g., in series) with the circuit breakers 122 to control activation/deactivation of a respective circuit breaker. The companion modules 200 and associated circuit breakers 122 may be located in separate electrical boxes (e.g., a main electrical panel and a companion module panel) within the load center 120.

In an embodiment, the ATS 130 is an intelligent power switching device having a microprocessor-based controller configured to automatically disconnect from the main power feed 132 of the public utility grid 140 and connect to a local power feed 134 of the local power source 102 when power from the public utility grid 140 goes down (i.e., power fails or becomes unavailable). Illustratively, the ATS 130 includes a low voltage control 135 in communication with the microgrid controller that is configured to initiate (trigger) starting of the local power source 102 in the absence of power from the public utility grid 140. When power from the public utility grid 140 subsides (terminates), the microgrid controller signal the ATS via control 135 to start the local power source 102 during a transfer time (not shown). Power is then provided over the local power feed 134, through the ATS 130 and over the power feed 136 to the load center 120.

A grid voltage transformer (VT) 142 is configured to monitor the public utility grid voltage (e.g., via a voltage monitoring branch circuit) to determine when the voltage sufficiently subsides (e.g., near a zero-crossing) so that it is safe to turn-on (activate) the local power source 102. In an embodiment, the grid VT 142 converts and isolates utility line voltage, e.g., 240V, to a low voltage suitable for digital sampling. A panel VT 146 is a voltage transformer configured to monitor voltage provided to the load center 120. In an embodiment, the FLM system 100 may also include one or more current transformers (CTs) configured to monitor current from the public utility grid 140 that is provided to the load center 120.

A smart energy monitor (SEM) 144 is configured to monitor (measure) the voltages and currents from the transformers, as well as from other loads (such as air conditioners) in the premises. Illustratively, the SEM 144 is embodied as an analog-to-digital (A-D) converter that collects and samples the voltages/currents from the VTs/CTs. The voltages and currents are preferably sampled at a high data rate (e.g., 1 kHz) by the SEM 144, which performs operations (i.e., computations) directed to, e.g., power factor, apparent/real power, etc., for power management calculations. The sampled data is then provided to the microgrid controller 106 over control and data signal lines 148 to determine a power capacity level of the FLM system, in accordance with the embodiments described herein.

Figure 2:
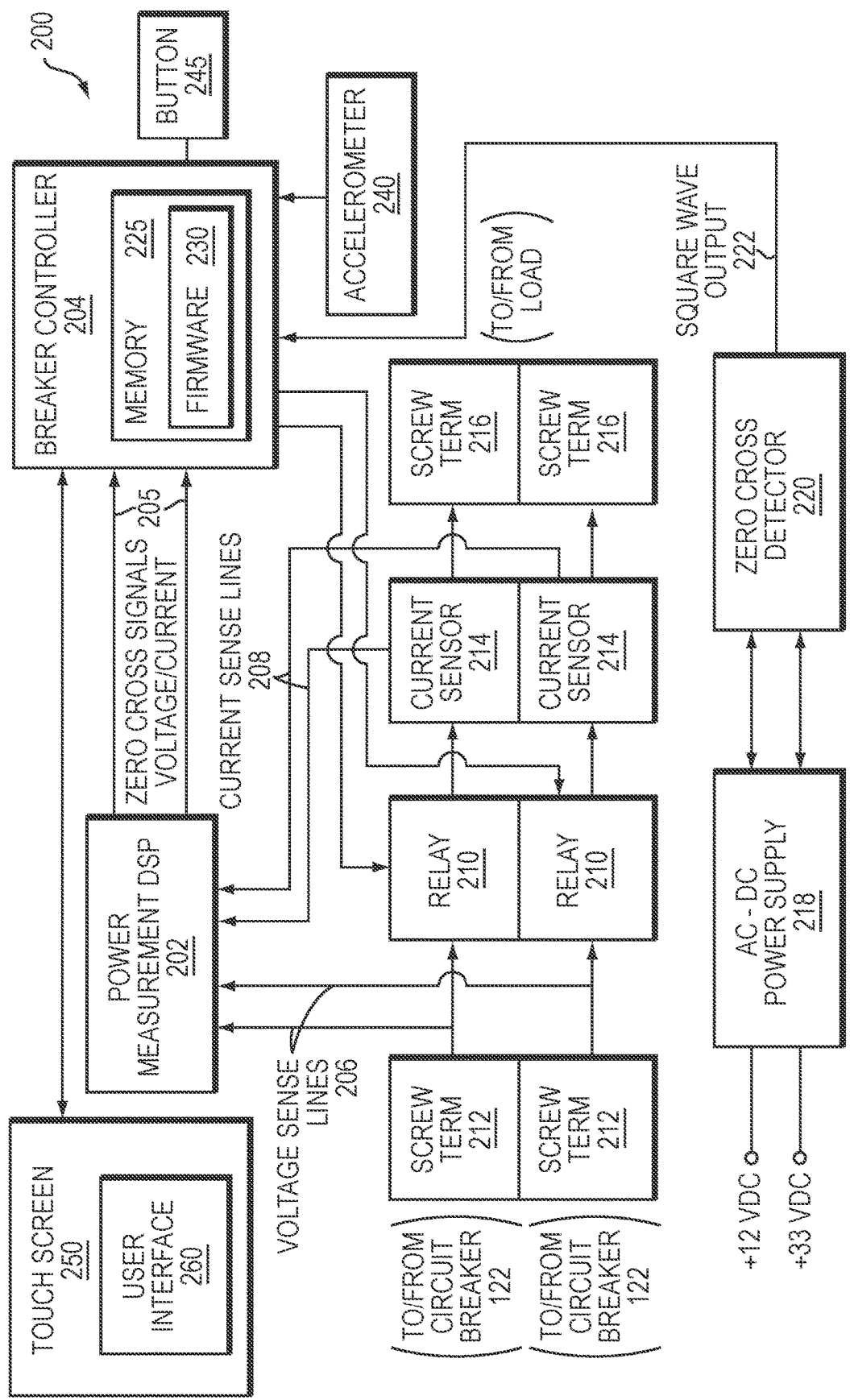
FIG. 2 is a block diagram of a companion module of the FLM system.

FIG. 2 is a block diagram of a companion module 200. In an embodiment, the companion module operates to support, e.g., turn on (and off), one or more relays, e.g., one 30 A/240 VAC circuit or, illustratively, two 15 A/120 VAC circuits. A power measurement digital signal processor (DSP) 202 is coupled to a breaker controller 204 having a processor with onboard wireless (Bluetooth®) transceiver. The power measurement DSP 202 is also coupled to voltage sense lines 206 and current sense lines 208. As described further herein, the breaker controller 204 also includes a memory 225 (e.g., RAM and/or Flash) adapted to store software programs or instructions embodied as firmware 230 configured to enable control of components (e.g., hardware) of the companion module 200.

A pair of relays 210 is coupled, respectively, between a pair of screw terminals 212 and a pair of current (e.g., Hall Effect) sensors 214. The relays are normally open (NO) to conduct power to a branch circuit and are coupled to each of the pair of screw terminals 212 serves as a connection point to, e.g., a conventional 15 A/120 VAC circuit breaker 122, such as an arc fault breaker, which is manually capable of being actuated. Alternatively, each relay 210 may be embodied as an actuated mechanical switch to obviate the need of the conventional circuit breaker while providing for adequate safety. Each of a pair of screw terminals 216 serves as a connection point to a desired load (not shown). An AC-to-DC power supply 218 outputs +12 VDC and +3.3 VDC to power the companion module 200. As an alternative to using power measurement DSP 202 to output pulses when the sensed voltage and current are near zero, a zero cross detector circuit 220 may be used to generate a square wave output signal which is coupled to the breaker controller 204 over line 222.

In an embodiment, power measurement DSP 202 is capable of calculating, among other values, instantaneous power consumption separately for each load connected to screw terminals 216, as well as average power consumption over a specified period of time, and peak power consumption. Power measurement DSP 202 may also be configured to output pulses over lines 205 to breaker controller 204 when the current and voltage are near zero. By knowing when zero crossings of current and voltage are occurring, breaker controller 204 ensures that relays 210 are only switched (i.e., opened or closed) contemporaneously with the occurrence of one or more zero crossings. This advantageously reduces arcing and tends to prolong the service lives of relays 210.

The companion module 200 also includes a graphical display 250 as well as a push button 245 included on a face of the companion module as an input device used to display and input information including icons, buttons, controls, messages, status, menus or other desired text on a user interface (UI) 260 to enable a user to configure and operate the companion module. An accelerometer 240 of the companion module 200 is configured to detect a gravitational orientation (i.e., a first orientation and an opposite or upside-down orientation) and movement of the module and, in response, generate a signal that is translated, e.g., by the breaker controller 204, to a corresponding change in orientation of the information displayed on the UI 260 of graphical display 250, particularly when the companion module inserted into the load center 120 used to form the vCLP 125. However, depending upon a physical position or location of the companion module within the load center, presentation of the information (such as menus and/or text) on the UI 260 may be inverted ("upside-down") thereby creating an undesirable user experience.

The embodiments described herein are directed to a menu selection technique based on orientation of a companion module used in a FLM system. The accelerometer 240 of the companion module 200 detects movement of the module and, in response, generates a signal that is translated (e.g., mapped) by the breaker controller 204 to a corresponding change in orientation (e.g., left or right side orientation) of the companion module when inserted into the load center 120. That is, a physical position or location of the companion module within the load center may be dependent on orientation of the module as determined by the accelerometer 240. Such physical position determination is processed by the controller 204 to obviate inverted ("upside-down") presentation of menu information (text) displayed on the UI 260 of graphical display 250.

Figure 3A:
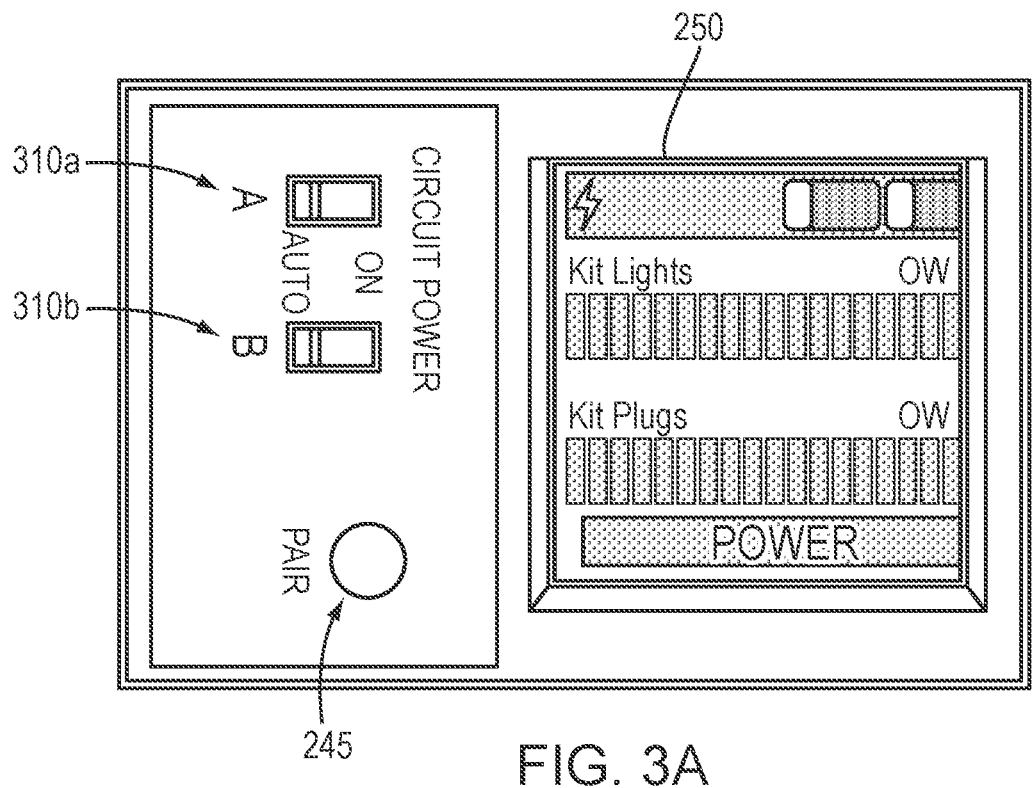
FIGS. 3A and 3B are screenshots of a user interface (UI) embodiment that display loads on a graphical display whose position depends on orientation of the companion module within the virtual critical load panel of the FLM system.
Figure 3B:
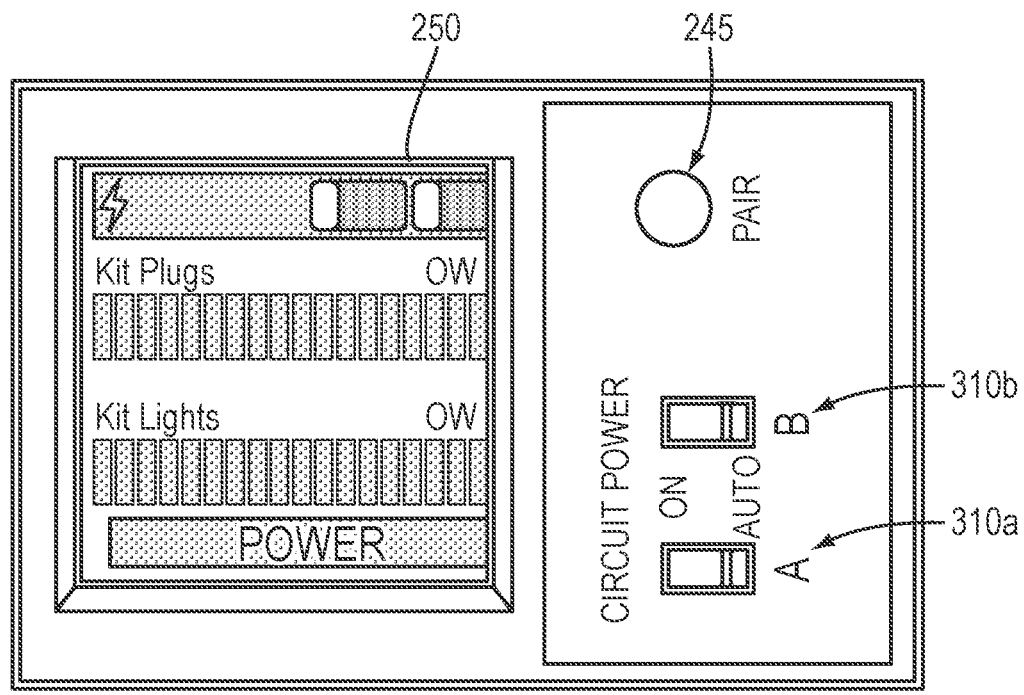

FIGS. 3A and 3B are screenshots of a UI embodiment that display loads (e.g., kitchen plugs and kitchen lights) on the graphical display 250 whose position (e.g., right and left sides) depends on orientation of the companion module 200 within the load center 120 of the FLM system 100. Rectangular rocker switches 310a,b (e.g., Channels A/B circuit power switches) on a side of the companion module 200 are stationary, but oriented differently (e.g., left side or right side) depending on physical position or location of the companion module 200 within the load center 120. The UI 260 of graphical display 250 illustrates the left/right orientation so that a user knows on which side of the panel 125 the companion module 200 is inserted depending on, e.g., whether graphical display 250 is on a left or right side or whether channel A assumes a top or bottom vertical orientation.

A feature of the companion module 200 includes the ability to name loads (e.g., plugs, lights, etc.) within respective locations (e.g., kitchen, dining room, bedroom, etc.) in the premises, wherein a software application, e.g., of microgrid controller 106, communicates via low-power wireless communication (e.g., Bluetooth low energy, BLE) to set the names in firmware 230 of the companion module. To ensure the information displayed on the UI 260 conforms to a relatively small size (i.e., display "footprint") of the graphical display 250, the technique employs the button 245 on the companion module 200 to cycle through various menus and enumerated names of the loads and their locations. Alternatively graphical display 250 includes a touchscreen, wherein the processor is configured to accept input from the touchscreen to select a menu item. In another embodiment, messages via the mobile application may communicate with the companion module as a user interface device to provide selection capability (i.e., interactively similar to the button 245) according to an interface on the mobile device executing the mobile application.

In an embodiment, another feature of the companion module 200 involves setting predetermined names for the loads and their locations in the firmware 230 directly from the UI 260 of the graphical display 250. Illustratively, a user may scroll through the predetermined names by manipulating (e.g. depressing) the display screen button 245. For example, a first menu may illustrate (present) a list of enumerated "rooms" on the UI 260. A user may scroll through the list of room names and select (e.g., via the button 245) a particular room. A second menu may illustrate a list of enumerated "loads" that are sensitive to the selected room (e.g., lights and outlets of a selected bedroom). The user may scroll through the list of load names and select (e.g., via the button 245) a load for each of the two channels (channels A/B) associated with relays 210 of the companion module 200.

Figure 4A:
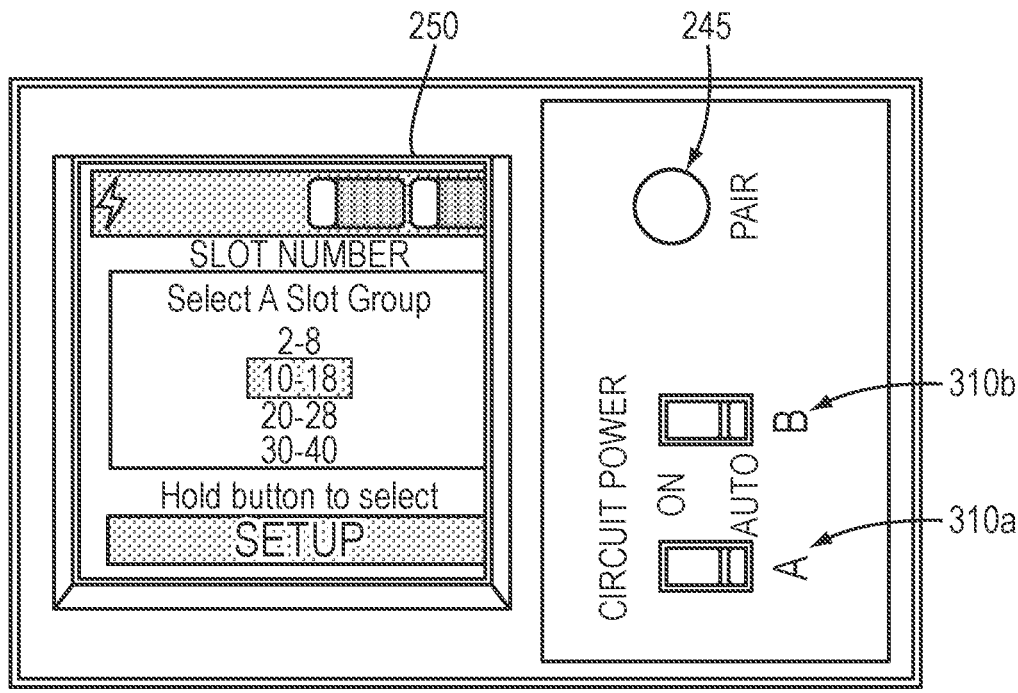
FIGS. 4A and 4B are screenshots of a UI embodiment that displays menus of slot numbers of the companion module on the graphical display in accordance with a menu selection technique.
Figure 4B:
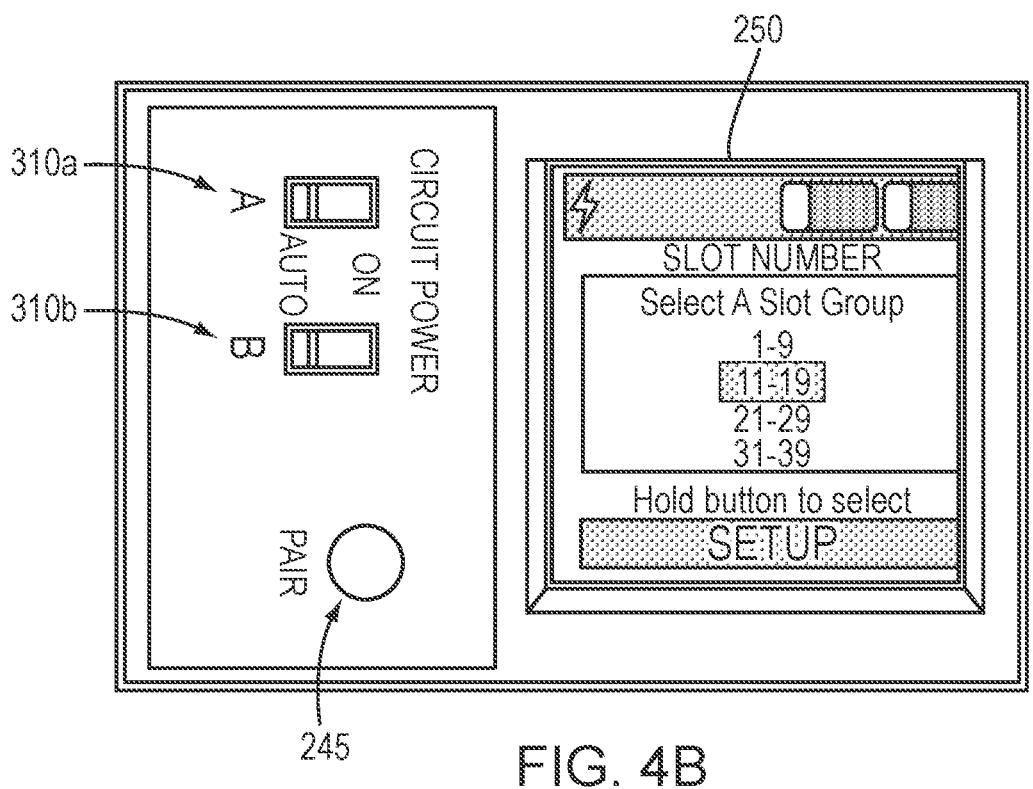

FIGS. 4A and 4B are screenshots of a UI embodiment that display menus of slot numbers and loads of the companion module in accordance with the menu selection technique. A third menu may illustrate a list of enumerated "slot numbers," where the slot number identifies the physical location at which the companion module 200 is inserted (mounted) in the load center 120. The physical position or location (slot number) of the mounted companion module may also be used to construct a graphical representation of the vCLP/load center (e.g., as displayed on the UI 260 of the graphical display 250) for use by an installer (electrician) when configuring and/or maintaining (e.g., repairing) companion modules 200 of the load center. To limit the information presented on the display screen, e.g., per convention and/or regulation in a jurisdiction where the load center is installed, the technique employs different menu displays depending on the detected orientation. For example the different menu displays may include ODD numbers for slots on the LEFT side (i.e., companion module in a first orientation) of the load center and EVEN numbers for slots on the RIGHT side (i.e., companion module in a second orientation opposite or upside-down relative to the first orientation) of the load center. Note that the slot numbering convention may be altered depending on the slot position. Note also that the UI 260 of the graphical display 250 is positioned (i) on the left side of the module, e.g., when channel A rocker switch 310a,b is presented at the right side of the module in a bottom position orientation or (ii) on the right side of the module, e.g., when channel A rocket switch 210 is presented at the left side of the module in a top position orientation. In either case, the title "Slot Number" is presented on the top of the display screen is a vertical orientation that enables the user to properly read the menus/slot number selections within a Slot Group.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly, this description is to be taken only by way of example and not to otherwise limit the scope of the invention. It is thus the object of the appended claims to cover all such variations and modifications as come within the true spirit and scope of the invention.

What is claimed is:

1. An apparatus having a form factor adapted to fit a power conductor compatible within an electrical load center, the apparatus comprising:
   a first switch coupled to a processor, a display, a first load terminal and a first power connector, the first switch adapted for conducting power from the power conductor via the first power connector to the first load terminal;
   an accelerometer coupled to the processor; and
   a display coupled to the processor, the display visible when the apparatus is mounted in the load center, the processor configured to,
      show a menu on the display oriented according to a detected orientation of the apparatus being one of upside-down or right-side-up by the accelerometer based on a position of the apparatus in a left side of the load center being upside-down from the position of the apparatus in a right side of the load center, wherein the menu displays a slot number according to a slot number convention for the load center identifying a physical location of the apparatus within the load center.

2. The apparatus of claim 1, wherein the slot number includes one or more odd numbers identifying the physical location of the apparatus in the electrical load center when the position of the apparatus is on the left side of the load center.

3. The apparatus of claim 1, wherein the slot number includes one or more even numbers identifying the physical location of the apparatus in the electrical load center when the position of the apparatus is on the right side of the load center.

4. The apparatus of claim 1 further including a button visible when the apparatus is mounted in the load center, and wherein the processor is further configured to accept input from the button to select a menu item.

5. The apparatus of claim 1, wherein the processor is further configured to show a name of a load connected to the first load terminal on the display.

6. The apparatus of claim 1, further comprising a second switch coupled to the processor and a second power connector, wherein the second switch is adapted for conducting power from the second power connector to a second load terminal.

7. The apparatus of claim 6, wherein the processor is further configured to show names of loads connected to the first and second load terminals on the display.

8. The apparatus of claim 1, wherein the display is a touchscreen and wherein the processor is further configured to accept input from the touchscreen to select a menu item.

9. The apparatus of claim 1, wherein the position of the apparatus is used to construct a graphical representation of the load center on the display.

10. The apparatus of claim 1 wherein the apparatus is a companion module.

11. The apparatus of claim 1 further including a wireless transceiver coupled to the processor in wireless communication with a mobile device executing a mobile application, wherein the processor is further configured to accept input from the mobile application via the wireless communication.

12. The apparatus of claim 11, wherein the wireless transceiver is a Bluetooth transceiver.

13. A non-transitory computer readable medium having program instructions executable on a processor of a companion module installed in a load center, wherein the companion module includes (i) a switch and an accelerometer coupled to the processor, (ii) a display visible when the companion module is mounted in the load center, (iii) a load terminal coupled to a power conductor of the load center and (iv) a power connector, the switch adapted for conducting power from the power conductor via the power connector to the load terminal, the program instructions configured to,
  detect, using the accelerometer, an orientation of the companion module being one of upside-down or right-side-up based on a position of the companion module in a left side of the load center being upside-down from the position of the companion module in a right side of the load center; and
  show a menu on the display oriented according to the detected orientation, wherein the menu displays a slot number according to a slot number convention for the load center identifying a physical location of the companion module within the load center.

14. The non-transitory computer readable medium of claim 13, wherein the slot number includes one or more odd numbers identifying the physical location of the companion module in the electrical load center when the position of the companion module is on the left side of the load center.

15. The non-transitory computer readable medium of claim 13, wherein the slot number includes one or more even numbers identifying the physical location of the companion module in the electrical load center when the position of the companion module is on the right side of the load center.

16. The non-transitory computer readable medium of claim 13, wherein the processor is further configured to accept input from a button visible when the companion module is mounted in the load center to select a menu item.

17. The non-transitory computer readable medium of claim 13, wherein the processor is further configured to show a name of a load connected to the load terminal on the display.

18. A method for showing information on a display of a companion module visible when the companion module is installed in a load center, wherein the companion module includes a switch and an accelerometer, a load terminal and a power connector coupled to a power conductor of the load center, the switch adapted to conduct power from the power conductor via the power connector to the load terminal, the method comprising:
  detecting, using the accelerometer, an orientation of the companion module being one of upside-down or right-side-up based on a position of the companion module in a left side in the load center being upside-down from the position of the companion module in a right side of the load center; and
  showing a menu on the display oriented according to the detected orientation, wherein the menu displays a slot number according to a slot number convention for the load center identifying a location of the companion module within the load center.

* * * * *